United States Patent
Dinha et al.

(10) Patent No.: US 10,530,587 B2
(45) Date of Patent: Jan. 7, 2020

(54) WEB SCALE AUTHENTICATION

(71) Applicant: OpenVPN Technologies, Inc., Pleasanton, CA (US)

(72) Inventors: Francis Dinha, Dublin, CA (US); James Yonan, Pleasanton, CA (US)

(73) Assignee: OpenVPN Technologies, Inc., Pleasanton, CA (US)

( * ) Notice: Subject to any disclaimer, the term of this patent is extended or adjusted under 35 U.S.C. 154(b) by 128 days.

(21) Appl. No.: 15/199,097

(22) Filed: Jun. 30, 2016

(65) Prior Publication Data
US 2017/0012782 A1    Jan. 12, 2017

Related U.S. Application Data

(60) Provisional application No. 62/189,717, filed on Jul. 7, 2015.

(51) Int. Cl.
*H04L 9/32* (2006.01)

(52) U.S. Cl.
CPC .................................. *H04L 9/3268* (2013.01)

(58) Field of Classification Search
CPC ......... H04L 9/32; H04L 9/321; H04L 9/3263; H04L 9/3268; H04L 63/08; H04L 63/0823
See application file for complete search history.

(56) References Cited

U.S. PATENT DOCUMENTS

| | | | | |
|---|---|---|---|---|
| 6,615,347 B1* | 9/2003 | de Silva | ................ | H04L 9/3263 713/156 |
| 7,117,360 B1* | 10/2006 | Zhao | ..................... | H04L 63/101 713/158 |
| 2003/0217265 A1* | 11/2003 | Nakano | ............ | G11B 20/00086 713/158 |
| 2003/0236976 A1* | 12/2003 | Wheeler | ............. | H04L 63/0823 713/158 |
| 2005/0257046 A1* | 11/2005 | Durand | ................. | H04L 9/3268 713/158 |
| 2006/0168357 A1* | 7/2006 | Nakano | ............ | G11B 20/00086 710/5 |
| 2008/0189545 A1* | 8/2008 | Parkinson | ........... | H04L 63/0823 713/158 |

(Continued)

OTHER PUBLICATIONS

Hollenbeck et al., Guidelines for the Use of Extensible Markup Language (XML) within IETF Protocols, Jan. 2003, https://tools.ietf.org/pdf/rfc3470.pdf (Year: 2003).*

*Primary Examiner* — Khang Do
(74) *Attorney, Agent, or Firm* — Antero Tormey Petrin; Pete Tormey

(57) ABSTRACT

A system and method for efficient certificate authentication management and distribution of large, web scale authentication information. The method includes receiving at a server, security certificate information, said security certificate including a unique certificate identifier. A structured data source, such as an XML file or database is encoded with a unique record for each possible security certificate using the record ID as the security certificate ID. Each unique record includes a record of four bits or less. Owing to the small size of the data source, large amounts of security certificates may be managed and distributed efficiently over a network to one of more private gateways allowing for large scale certificate authentication.

11 Claims, 1 Drawing Sheet

(56) References Cited

U.S. PATENT DOCUMENTS

| | | | |
|---|---|---|---|
| 2009/0260057 A1* | 10/2009 | Laberteaux | H04L 63/0823 726/2 |
| 2010/0122081 A1* | 5/2010 | Sato | H04L 9/0891 713/158 |
| 2012/0072721 A1* | 3/2012 | Rescorla | H04L 9/3268 713/158 |
| 2012/0124382 A1* | 5/2012 | Little | H04L 63/0272 713/176 |
| 2012/0124653 A1* | 5/2012 | Alnas | H04L 41/28 726/6 |
| 2013/0117558 A1* | 5/2013 | Metke | G06F 21/33 713/156 |
| 2015/0381374 A1* | 12/2015 | Zombik | H04L 9/3268 713/158 |
| 2016/0034693 A1* | 2/2016 | Takeuchi | G06F 21/602 713/189 |
| 2016/0112206 A1* | 4/2016 | Cizas | H04L 9/3263 713/158 |
| 2016/0344559 A1* | 11/2016 | Ma | H04L 9/3263 |
| 2018/0167222 A1* | 6/2018 | Grajek | H04L 9/3263 |

* cited by examiner

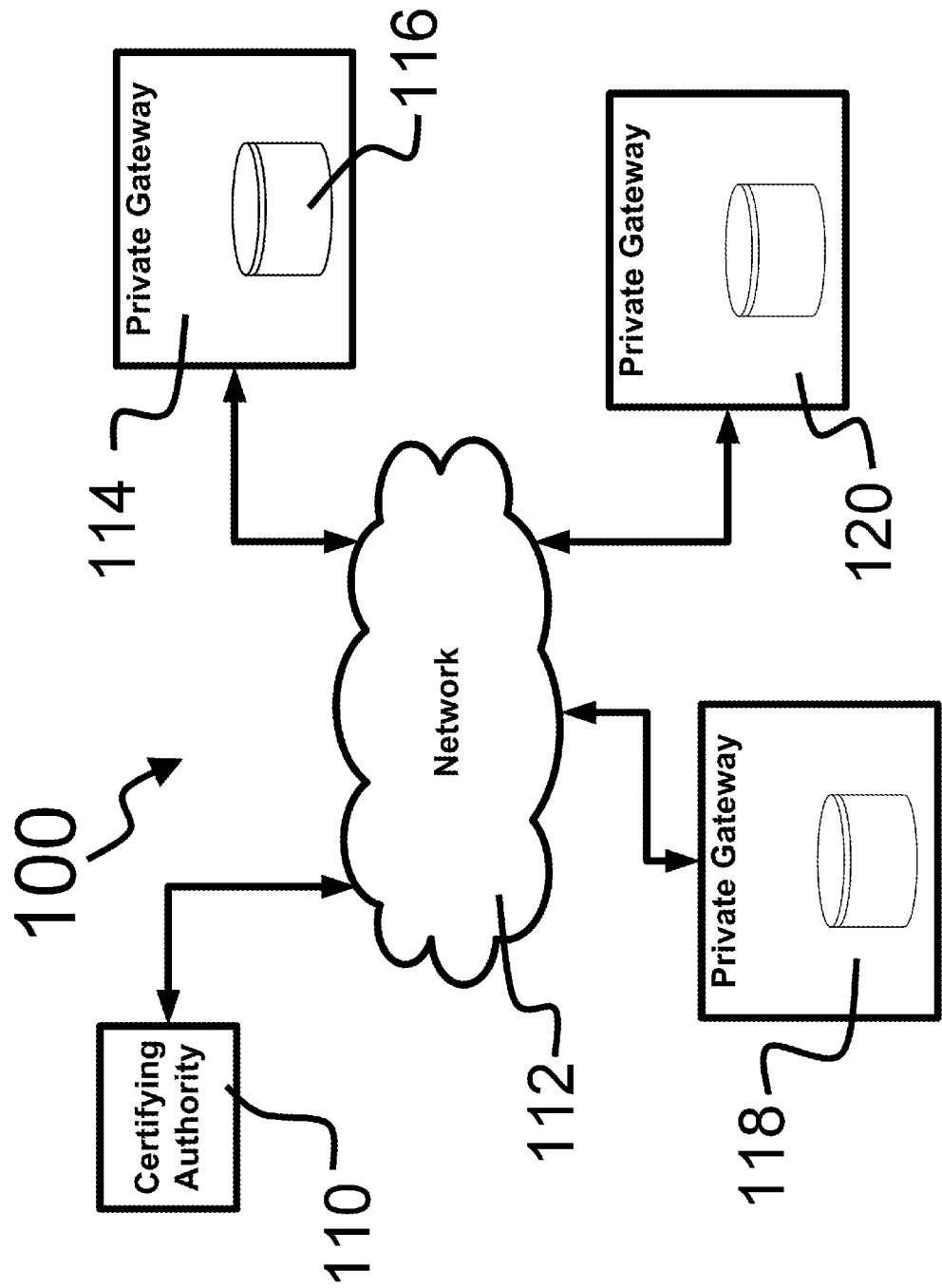

WEB SCALE AUTHENTICATION

PRIORITY

This application claims the benefit of provisional patent application 62/189,717 entitled Web Scale Authentication, filed Jul. 7, 2015 by the same inventors, which is incorporated, together with its appendix, by reference as if fully set forth herein.

BACKGROUND

Conventional secure online systems employ a certificate revocation list (CRL) to indicate which certificates have been revoked so that if those certificates are presented again, the system will know they are no longer valid. The list conventionally includes the serial numbers for certificates that are revoked.

Certificate revocation lists have a lifetime during which they are valid; this lifetime is conventionally 24 hours or less. The timing for the publication of the CRL depends on whether the system needs immediate notification or if hourly or daily publication is sufficient.

To operate a secure system effectively, the system must access current CRLs. For large-scale systems the CRLS may be quite large making managing them and distributing them to a broad audience inefficient. Moreover, requiring a system to check a remotely-located CRL takes time and opens the system to potential security attacks.

To reach levels of scalability, a robust authentication technology is needed to allow individual private gateway server nodes to authenticate any one of a large number of certificates in the face of possible loss of connectivity to the backend authentication databases.

BRIEF DESCRIPTION OF THE DRAWINGS

FIG. 1 shows a block diagram which may include elements of an embodiment according to the current disclosure.

SUMMARY

Disclosed herein is a system and method for efficient certificate authentication management and distribution including receiving at a server, security certificate information, said security certificate including a unique certificate identifier. A structured data source, such as an XML file or database is encoded with a unique record for each unique security certificate using the record ID as the security certificate ID. Each unique record includes a record of four bits or less. Owing to the small size of the data source, large amounts of security certificates may be managed and distributed efficiently over a network to one of more private gateways allowing for large scale certificate authentication.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Certain embodiments may be effectuated using the information in the attached Technical Appendix which, together with its associated figure, is incorporated by reference as if fully set forth herein.

The construction and method of operation of the invention, however, together with additional objectives and advantages thereof will be best understood from the following description of specific embodiments when read in connection with the accompanying drawings.

Lexicography

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example, and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this description" (and similar terms and phrases) generally indicate any material shown or suggested by any portions of this application, individually or collectively, and include all reasonable conclusions that might be drawn by those skilled in the art when this application is reviewed, even if those conclusions would not have been apparent at the time this application is originally filed.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

System Elements

Certain embodiments may be effectuated using the information in the attached appendix which is incorporated by reference as if fully set forth herein.

FIG. 1 shows a block diagram which may include elements of an embodiment according to the current disclosure. In FIG. 1 a system 100 includes a certifying authority 110. The certifying authority is coupled to a network 112 which may be the Internet, private network or cloud. A private gateway 114 is coupled to the network 114 for providing secure connections to users (not shown). Coupled to the private gateway 114 is a structured data source 116. The structured data source may be an XML file, a database and the like, capable of storing and sourcing data. Also coupled to the network 112 are additional private gateways 118 and 120.

In operation the private gateway 114 stores a CRL in its associated structured data source 116. The CRL is provided to the private gateway 114 by the certifying authority 110. The CRL contains information on which users' cryptographic certificates are allowed or disallowed at any given time. For a private gateway 114 to verify a security certificate it must search the data source 116 to see find the status of the certificate. If the certificate is valid, the private gateway 114 will allow the user access to the protected resources.

In an exemplary embodiment of the current disclosure the CRL may be stored in a structured data source. To effectuate efficient searching of the data source, each record in the data source corresponds to a certificate. In some embodiments the record ID and the certificate ID may be the same number. Additionally, the data associated with a unique record may be less than 8 bits. For example, and without limitation, a four-bit data record may be stored in the structured data source.

Using only 4 bits allows up to 16 possible results from a query directed at the data source, which are an authentication status. For example, the following authorization status may be returned:

SUCCESS [0]—successful authentication.
SUCCESS_PLUS [1]—successful authentication with additional services.
CERT_REVOKED [2]—failed authentication because certificate is revoked.
BILLING_SUSPEND [3]—failed authentication because of billing issues.
BLOCKED_FROM_CLUSTER [4]—failed authentication because user is not authorized to connect to this region.
ADMIN_SUSPEND [5]—failed authentication because the administrator disabled the account.

As used in the preceding example, each certificate will have an entry in the data source using the record ID as the certificate number. Details about that certificate are returned by a query, which may be used on a local machine or transmitted to a remote device. Several advantages of this technique are the small sized of the resulting data source. Moreover, indexing into the data source is extremely fast. A single record can be accessed in less than 1 microsecond using commodity hardware.

Other embodiments may include using a single bit, or pair of bits to indicate authentication. For example, and without limitation, the least significant bit may indicate whether the user is authenticated, while the more significant bits indicate status (revoked, billing, etc. . . . ). In operation, a user may query a CRL by sending a single record request corresponding to the certificate number, and receiving a single flag representing the least significant bit as an authorization indicator. Accordingly, a CRL may be considerably smaller.

Because of the extreme economy of space in this embodiment, a data source containing authentication information on 1 billion users can be stored in as little as 500 MB. A file of this size is small enough that it can easily be replicated to each private gateway server node in a cloud and then cached in local memory for rapid access.

Certain embodiment may include a system with multiple private gateways providing virtual private network (VPN). The entire data source can be easily transmitted to each private gateway for storage in-memory allowing for easier and quicker management of a certifying authority and much faster operations with certificate at each private gateway.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed:
1. A method of providing network security including:
receiving at a server, security certificate information for one or more security certificates, and
encoding in a structured data source, a unique record for each security certificate, wherein each unique record has a record identifier (ID) and is 4 bits or less in size, wherein said encoding includes using a record ID of each unique record as a certificate number for the respective security certificate, and transmitting the structured data source over a network to one or more private gateways.

2. The method of claim 1 wherein the structured data source is a database or an extended markup language (XML) file.

3. The method of claim 1 wherein the network is the Internet.

4. The method of claim 1 wherein each unique record has a single bit in the record that indicates authentication.

5. A method including:

encoding in the structured data source a unique record for each security certificate, wherein each unique record has a record identifier (ID) and is 4 bits or less in size, wherein said encoding includes using a record ID of each unique record as a certificate number for the respective security certificate;

receiving an authentication request from a network, said authentication request including a security certificate number, and querying the structured data source by reading a record corresponding to the security certificate number, wherein the results of said querying includes authentication information.

6. The method of claim 5 wherein the structured data source is an extended markup language file.

7. The method of claim 5 wherein the network is the Internet.

8. The method of claim 5 wherein each unique record has a single bit in the record that indicates authentication.

9. A processor readable storage device having non-transitory processor-readable instructions, said instructions configured to direct a processor to perform a method comprising:

receiving at a server, security certificate information for one or more security certificates, encoding in a structured data source a unique record for each security certificate, wherein each unique record has a record identifier (ID) and is 4 bits or less in size, wherein said encoding includes using a record ID of each unique record as a certificate number for the respective security certificate; and transmitting the structured data source over a network to one or more private gateways, wherein the private gateways are configured to query the structured data source to retrieve the security certificate information.

10. The device of claim 9 wherein the structured data source is a database or an extended markup language (XML) file.

11. The device of claim 9 wherein the network is the Internet.

* * * * *